US008224788B2

(12) United States Patent
Schachter (10) Patent No.: US 8,224,788 B2
(45) Date of Patent: *Jul. 17, 2012

(54) SYSTEM AND METHOD FOR BOOKMARKING AND AUTO-TAGGING A CONTENT ITEM BASED ON FILE TYPE

(75) Inventor: Joshua Schachter, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 116 days.

This patent is subject to a terminal disclaimer.

(21) Appl. No.: 12/354,562

(22) Filed: Jan. 15, 2009

(65) Prior Publication Data
US 2010/0088583 A1 Apr. 8, 2010

Related U.S. Application Data

(63) Continuation of application No. 11/452,127, filed on Jun. 12, 2006, now abandoned, which is a continuation-in-part of application No. 11/231,337, filed on Sep. 20, 2005, and a continuation-in-part of application No. 11/273,580, filed on Nov. 14, 2005.

(51) Int. Cl.
*G06F 17/30* (2006.01)

(52) U.S. Cl. .................... 707/672; 707/673; 707/726

(58) Field of Classification Search ................ None
See application file for complete search history.

(56) References Cited

U.S. PATENT DOCUMENTS

| 6,311,194 | B1 | 10/2001 | Sheth et al. |
| 6,892,181 | B1 | 5/2005 | Megiddo et al. |
| 2002/0184095 | A1 | 12/2002 | Scullard et al. |
| 2005/0261962 | A1 | 11/2005 | Chuah |
| 2006/0282328 | A1 | 12/2006 | Gerace et al. |
| 2007/0011155 | A1 | 1/2007 | Sarkar |
| 2007/0033531 | A1 | 2/2007 | Marsh |
| 2007/0067297 | A1* | 3/2007 | Kublickis ..................... 707/9 |
| 2007/0124208 | A1* | 5/2007 | Schachter et al. .......... 705/14 |

* cited by examiner

*Primary Examiner* — Baoquoc To
(74) *Attorney, Agent, or Firm* — Seth H. Ostrow; Ostrow Kaufman LLP

(57) ABSTRACT

The present invention is directed towards systems and methods for bookmarking and tagging content items such as media files with user-defined tag information and system-defined tag information based on file types. Utilizing tag information, a user of a bookmarking and tagging service provider can easily search for and retrieve links to media files having specific tag information, even if the media files are located at geographically disparate sites. A user may also retrieve the media files using web feeds.

17 Claims, 6 Drawing Sheets

SYSTEM AND METHOD FOR BOOKMARKING AND AUTO-TAGGING A CONTENT ITEM BASED ON FILE TYPE

CLAIM OF PRIORITY

This application is a continuation application of and claims priority to U.S. Ser. No. 11/452,127, filed on Jun. 12, 2006, entitled "SYSTEM AND METHOD FOR BOOKMARKING AND AUTO-TAGGING A CONTENT ITEM BASED ON FILE TYPE," is a Continuation-In-Part of and claims priority to U.S. application Ser. No. 11/231,337, filed on Sep. 20, 2005, and is a Continuation-In-Part of and claims priority to U.S. application Ser. No. 11/273,580, filed on Nov. 14, 2005.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present invention generally relates to electronic bookmarking. More specifically, embodiments of the present invention may provide methods and systems for saving references to content items along with tag information. Embodiments of the present invention may provide methods and systems for automatically adding tag information to references to content items based on the file types of the content items, and for searching and retrieving references to content items based on tag information. Embodiments of the present invention may provide methods and systems for generating and updating feeds based on one or more references to content items, as well as downloading the content items included as enclosures in feeds.

BACKGROUND

A number of techniques are known to those of skill in the art for saving references to content items. One example is a bookmark control available by most popular web browsers. A user utilizes a web browser to view content items, including content items available over a network, such as the Internet. When the user navigates to a content item to which he or she wishes to save a reference, the user utilizes a bookmark control from the web browser to save a reference to the content item. For example, where a given content item is identified by an address, such as a URL, the browser saves a local reference to the content item that includes the address of the content item. When the user subsequently wishes to view the content item, the user may select the locally saved reference to the content item, which causes the browser to retrieve the content item that the address identifies.

In some cases, a user may wish to organize references to content items by grouping together references to like content items. For example, a user may wish to group references to media files, such as video files. A user may wish to associate personally meaningful descriptors with various video files. One example of a technique for grouping references is to utilize a bookmark control in a browser to group bookmarks according to personally meaningful descriptors, such as organizing bookmarks into various folders. For example, a user may create a folder of bookmarks with the name "funny videos" and use it to store references to video files that the user deems funny. In some cases, a user may wish to search for specific types of content items matching certain criteria. For example, a user may wish to search for "funny videos." A user may use an algorithmic search engine to search for funny videos at one or more disparate sites. However, algorithmic search engines may not have any way of determining whether specific video files are in fact funny.

A number of techniques are known to those of skill in the art for saving references to content items and in particular to content items with updated content drawn from multiple disparate sources. One example is using web feeds. Web feeds may be used to share the most recent headlines or latest entries in a blog, the full text of news articles and blog entries, and even media files such as audio clips and video clips. Media files may be added to web feeds as enclosures to the feed. Various news-reporting agencies now use web feeds and allow other web sites to republish their "syndicated" content (e.g., headline or headline plus short summary) feeds. Users of such news web feeds are able to have news "fed" to them, instead of searching for updated content.

There are a number of shortcomings associated with presently known techniques for saving references to content items. One shortcoming is that references to content items are saved locally on a workstation of a given user and are not available to the user when away from the workstation. Similarly, there are currently no mechanisms that allow a user to save a reference to content item that is accessible from a variety of workstations at geographically disparate locations. Also, there are no systems and methods that allow for a user to save a reference to a content item directly from a given content item or browser to a bookmarking and tagging service provider. Also, there are no systems and methods that allow a user to easily search for content items matching certain criteria, where the content items are spread out at many disparate sites. Also, there are no systems and methods that allow a user to easily access web feeds corresponding to updated content items, where the content items are media files.

Thus systems and methods are needed to allow a given user to remotely save references to content items, the references available to the given user from a plurality of geographically disparate workstations. Systems and methods are further needed that allow the given user to remotely save references to content items from within the browser, or from within a given content item, and that allow the user to easily search for content items with certain matching criteria where the content items are spread across a network at many disparate sites. Systems and methods are also needed that allow the user to generate and access web feeds corresponding to updated content items, where the content items are media files.

SUMMARY OF THE INVENTION

The present invention provides systems and methods for bookmarking and tagging content items.

A method according to one embodiment of the present invention comprises receiving a command to bookmark a content item, capturing content-identifying information that identifies the content item, determining a file type of the content item, tagging the content item with tag information based on the file type of the content item, and storing the content-identifying information and tag information. A bookmarking and tagging service provider may receive a command to bookmark a content item via a browser control or via a button control or hyperlink added to a web page by a content provider. The bookmarking and tagging service provider may capture content-identifying information such as a URL of the content item. The bookmarking and tagging service provider determines a file type by identifying a file extension, or by determining a class of media files such as audio files, video files, image files, or formatted text documents. A content item may be a MP3 file, a WAV file, a MPEG file, a AVI file, a MOV file, a JPEG file, a GIF file, a PNG file, a DOC file, or a PDF file. The bookmarking and tagging service provider may tag a content item by associating system-defined tag information with the content item. System-defined tag information may be associated with a content item if the content item is an audio file, a video file, an image file, or a formatted text document. The bookmarking and tagging service provider may store the content-identifying information and tag information as a bookmark in a database.

A method according to one embodiment of the present invention comprises receiving a command to search for bookmarked content items having specific tag information associated with the content items, querying a database of bookmarked content items for bookmarks having the specific tag information, and retrieving the bookmarks. A bookmarking and tagging service provider may receive a command to search for bookmarked content items when it receives tag information from a user. The bookmarking and tagging service provider may receive tag information from a user when a user navigates to a specific URL corresponding to a specific tag, when a user uses a tag navigation control on a web page, or clicks on a hyperlink associated with a specific tag. The tag information may correspond to a specific file type of content items, such as audio files, video files, image files, or formatted text documents. A bookmarking and tagging service provider may further display a list of retrieved bookmarks along with interactive controls if the bookmarked content items are media files such as audio files, video files, image files, or formatted text documents. A bookmarking and tagging service provider may further provide a control for generating a feed corresponding to a web page including a set of retrieved bookmarks. Such a control may be a button or a hyperlink on a web page to generate an RSS file or an Atom file.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In the following description of the preferred embodiment, reference is made to the accompanying drawings that form a part hereof, and in which is shown by way of illustration a specific embodiment in which the invention may be practiced. It is to be understood that other embodiments may be utilized and structural changes may be made without departing from the scope of the present invention.

Figure 1:
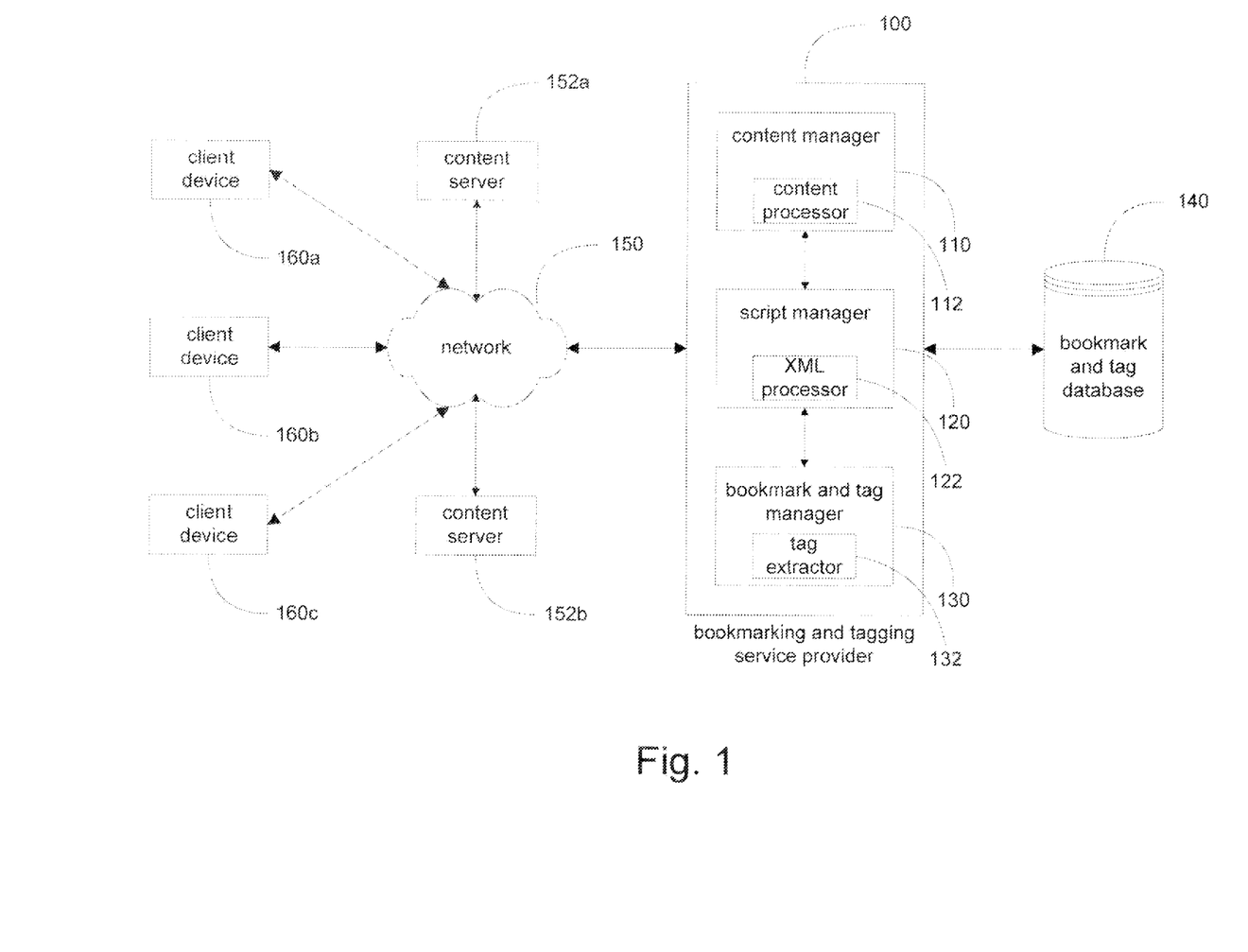
FIG. 1 is a block diagram presenting a system for bookmarking content items and receiving and storing bookmark information and tag information associated with bookmarked content items according to one embodiment of the present invention.

FIG. 1 presents a block diagram illustrating one embodiment of a system for bookmarking content items and receiving and storing tag information relating to bookmarked content items. According to the embodiment of FIG. 1, a bookmarking and tagging service provider 100 comprises one or more software and hardware components to facilitate bookmarking and tagging content items available from one or more content servers 152a and 152b, hereinafter identified as content server 152. The content items may be, for example, web pages, text documents, audio files, video files, multimedia files, or any other form of digital content accessible over a network.

In one embodiment, bookmarking and tagging service provider 100 includes, but is not limited to, a content manager 110, a script manager 120, and a bookmark and tag manager 130. The content manager 110 may include a content processor 112. The script manager 120 may include an extensible markup language (XML) processor 122. The bookmark and tag manager 130 may include a tag extractor 132. The bookmarking and tagging service provider 100 is also communicatively coupled to one or more data stores for providing persistent storage of information for bookmarking and tagging content items as well as providing access to stored bookmark information and tag information. Such data stores may include, but are not limited to, a bookmark and tag database 140. Bookmark and tag database 140 maintains bookmarks associated with each registered user of bookmarking and tagging service provider 100. Bookmark and tag database 140 maintains the association of tag information with bookmarks, with bookmarked content items, and with bookmark information.

The bookmarking and tagging service provider 100 is also communicatively coupled to a network 150, which may include a connection to one or more local and/or wide area networks, such as the Internet. The bookmarking and tagging service provider 100 receives commands from client devices 160a, 160b, and 160c, hereinafter identified as client device 160, communicatively coupled to network 150. Client device 160 may be any device that allows for the transmission of bookmarking and tagging requests to a bookmarking and tagging service provider 100, where the bookmarking and tagging requests may include retrieval and modification of stored bookmark information and stored tag information. According to one embodiment of the invention, a given client device 160 may be a general purpose computer comprising a processor, transient and persistent storage devices, an input/output subsystem, and a bus to provide a communications path among components comprising the general purpose computer. Client device 160 also has a network interface to the network 150, such as a wired or wireless Ethernet interface. Client device 160 typically runs software applications (such as web browsing applications) that allow for access to content items served by content server 152 and that allow transmission of bookmarking and tagging requests, which may include allowing for the retrieval and modification of stored bookmarks and stored tag information.

The bookmarking and tagging service provider 100 receives requests from a client device 160 to bookmark and tag content items available from a content server 152. For example, an individual user who is using client device 160 may use a web browser to navigate to a content item that a content server 152 hosts. The user sends a request to the bookmarking and tagging service provider 100 to bookmark the content item and to add tag information associated with the bookmarked content item. Bookmarking and tagging service provider 100 receives and processes the request. According to one embodiment, a bookmark is associated with a given content item and comprises bookmark information and any associated tag information.

Bookmark information is associated with content items, and may include, but is not limited to, content-identifying information and content-descriptive information regarding a given content item. Content-identifying information may include, but is not limited to, an address such as the universal resource locator (URL) for a content item. Content-descriptive information may include, but is not limited to, descriptive information added by a content provider such as a title to a web page or other metadata, other descriptive information not added by a content provider such as a filename or a file attribute, and user-defined descriptive information. Tag information is associated with a content item, and may include, but is not limited to, user-defined information such as keywords or other descriptors regarding the content item and/or system-defined information such as keywords or other descriptors regarding the content item. The tag information may be based on specific attributes of content items such as a file type. Tag information may comprise individual words, or tags, as well as groupings of tags.

A content manager 110 manages content items to facilitate web publishing and manages digital assets such as media files. Media files may include, for example, audio files, video files, image files, and formatted text documents. The content manager 110 manages content items and allows the bookmarking and tagging service provider 100 to serve web feeds. Content manager 110 comprises a content processor 112 that handles formatting content items and updating content. Content processor 112 also handles updating web feeds, podcasts, and other forms of syndicated content.

A bookmark and tag manager 130 associates registered users with bookmarking and tagging requests that the bookmarking and tagging service provider 100 receives. Bookmark and tag manager 130 associates incoming requests with bookmarks and tag information previously stored in bookmark and tag database 140. Bookmark and tag manager 130 may also associate bookmarks with registered users as well as with tag information previously stored in bookmark and tag database 140. Similarly, bookmark and tag manager 130 may also associate tag information with registered users as well as with bookmarks previously stored in bookmark and tag database 140.

Bookmark and tag manager 130 comprises a tag extractor 132. Tag extractor 132 extracts information about a given content item and associates system-defined tag information with the content item based on extracted information. For example, tag extractor 132 may extract information about a given content item regarding a specific attribute of the content item, such as a file type, and then associate system-defined tags with the content item. If a given content item is a media file, such as an audio file, tag extractor 132 may determine that it is an audio file encoded using the MPEG Layer-3 (MP3) scheme and may associate system-defined tag information with the content item when the content item is bookmarked. That is, a bookmark may contain, or have associated with it, system-defined tags based on the file type of the content item.

Bookmark and tag database 140 maintains bookmarks associated with each registered user of bookmarking and tagging service provider. Bookmark and tag database 140 maintains the association of tag information with bookmarks 100, with bookmarked content items, and with bookmark information. Bookmark and tag database 140 may be implemented, for example, as a relational database wherein individual registered users may be associated with bookmark information and with tag information. The bookmark and tag database 140 may also be implemented utilizing other data storage techniques know to those of skill in the art, e.g., an object-oriented database, a hybrid object-relational database, etc. Bookmark and tag database 140 maintains a tag space for each bookmarked content item. According to one embodiment, a tag space comprises a collection of tag information associated with a given content item. The tag space for a given content item may comprise a collection of all of the tag information associated with all of the bookmarks stored in bookmark and tag database 140 which are associated with the given content item. For example, one or more registered users may create a set of bookmarks for a given content item. Each bookmark in the set, though associated with the same given content item, may be associated with different tag information. The collection of all of the tag information associated with each bookmark in the set comprises the tag space for the given content item. Conversely, those of skill in the art recognize that a given tag may have an associated bookmark space on the basis of bookmarks utilizing the given tag.

A script manager 120 is communicatively coupled with the content manager 110 and the bookmark and tag manager 130. The script manager 120 may issue commands to content manager 110 and bookmark and tag manager 130 to facilitate formatting and updating content items, formatting and updating web feeds, receiving bookmarking and tagging requests from the registered user, as well as storing, accessing, and modifying bookmarks and tag information associated with one or more registered users. For example, script manager 120 may receive a bookmarking and tagging request when a user operating a web browser on a client device 160 navigates to a content item a content server 152 is hosting. Script manager 120 may receive such a request, for example, when a user clicks on a hyperlink or a button added to a web page by a content provider. Script manager 120 may also receive a bookmarking and tagging request, for example, when a user clicks on a browser button or enables a browser extension.

Script manager 120 comprises an extensible markup language (XML) processor 122. The XML processor 122 communicates with the content manager 110 to format and update content items as well as to format and update web feeds. The XML processor 122 also communicates with the bookmark and tag manager 130 in order to format and update web feeds based on retrieved bookmarks.

Figure 2:
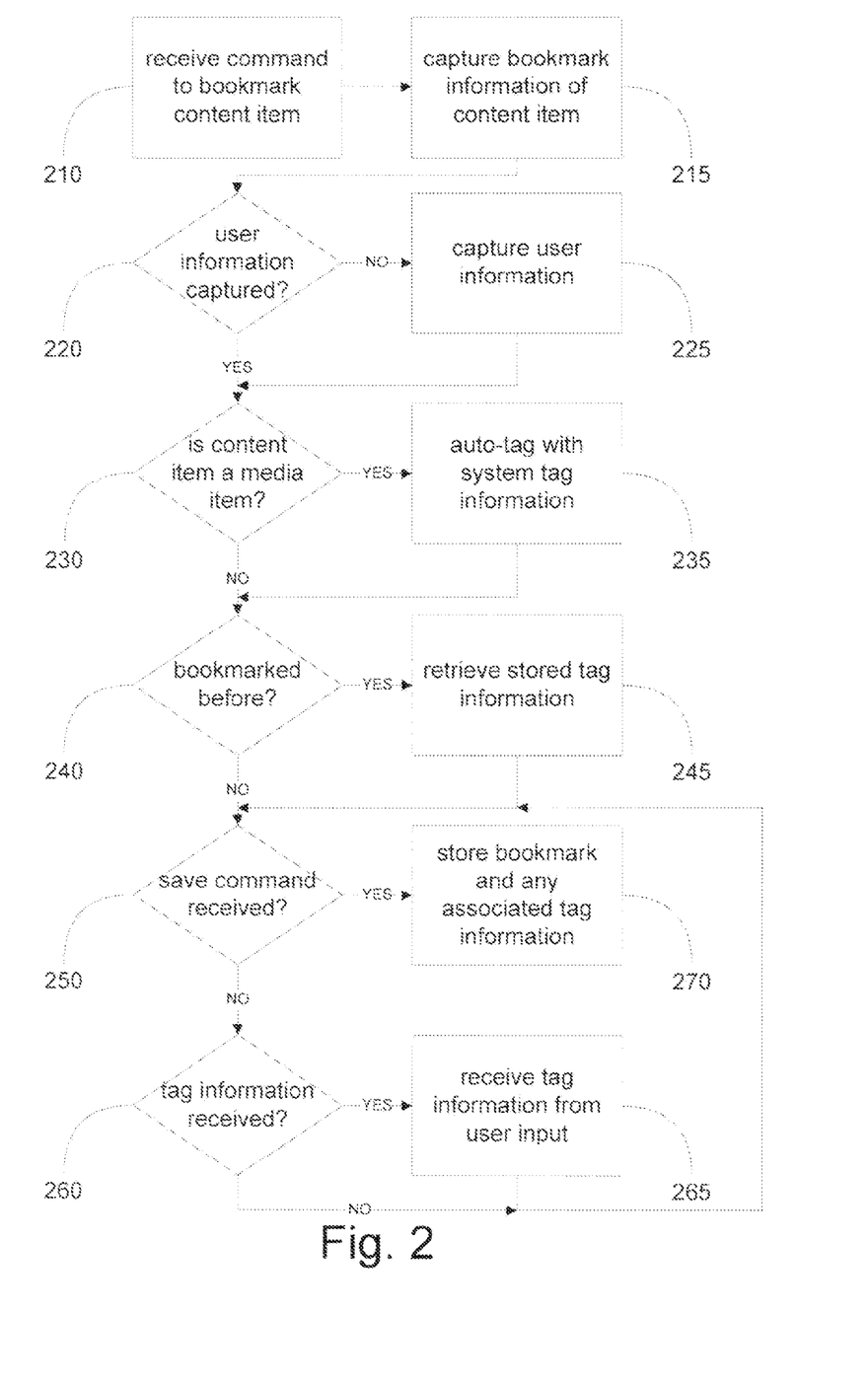
FIG. 2 is a flow diagram presenting a method for book marking a content item with tag information related to the bookmarked content item according to one embodiment of the present invention.

FIG. 2 presents a flow diagram illustrating one embodiment of a method for bookmarking a content item and receiving and storing tag information related to the bookmarked content item. According to the method of FIG. 2, a bookmarking and tagging service provider receives a command to bookmark a content item at step 210. A content item may be a web page, text document, audio file, video file, multimedia file, or any other form of digital content accessible over a network. A script manager of the bookmarking and tagging service provider receives the command to bookmark a content item, for example, when a user clicks on a button or a hyperlink added to a web page by a content provider, where the button or hyperlink may link to an HTTP request to initiate a connection with a bookmark and tagging service provider or to execute a script served by the bookmarking and tagging service provider. Alternatively, a script manager of a bookmarking and tagging service provider may receive a command to bookmark a content item, for example, when a user clicks on a browser button or activates a browser extension linked to an HTTP request to initiate a connection with a bookmark and tagging service provider or to execute a script served by the bookmarking and tagging service provider.

At step 215, the bookmarking and tagging service provider captures bookmark information. A script manager of the bookmarking and tagging service provider may capture bookmark information, such as content-identifying information. For example, the script manager captures content-identifying information, such as the URL of the content item, and saves the URL in a temporary data store.

After capturing bookmark information, the bookmarking and tagging service provider performs a check at step 220 to determine whether user information has been captured. User information may include, but is not limited to, a user ID, a client device ID, a password, public key, or other identifying information. If user information has not been captured, the bookmarking and tagging service provider attempts to capture the user information at step 225. A script manager of the bookmarking and tagging service provider may capture user information according to a number of techniques. For example, a script manager of the bookmarking and tagging service provider may issue commands or run scripts to check the user's client device for a cookie, certificate, or other electronic token or file containing identifying and authenticating information. Alternatively, or in conjunction with the foregoing, a script manager of the bookmarking and tagging service provider may capture user information via a form on a web page associated with a login or registration procedure. Similarly, a script manager of the bookmarking and tagging service provider may capture user information by issuing commands or running scripts to access a physical token, such as through a card reader or a biometric device coupled to the user's client device.

The bookmarking and tagging service provider performs a check at step 230 to determine whether the content item is a media file. A script manager of a bookmarking and tagging service provider extracts information, for example, by issuing commands to a bookmark and tag manager. A tag extractor may extract information, for example, about the file type of a content item in order to determine whether the content item is a media file. A media file may be, for example, an audio file, a video file, an image file, or a formatted text document.

In one embodiment, if a tag extractor of the bookmarking and tagging service provider determines that the content item is a media file at step 230, then the tag extractor may tag the content item with system tag information at step 235. Accordingly, the bookmarking and tagging service provider associates system-defined tag information with the content item. For example, if the content item is an MP3 file, the tag extractor of the bookmarking and tagging service provider may tag the MP3 file with the system-defined tags "system:media:audio" and "system:filetype:mp3."

The bookmarking and tagging service provider performs a check at step 240 to determine whether the content item has been bookmarked before, either by the user or by any other registered user. A script manager of a bookmarking and tagging service provider determines whether a content item has been bookmarked before, for example, by issuing commands to a bookmark and tag manager. The bookmark and tag manager queries a bookmark and tag database, for example, using captured bookmark information and captured user information to determine whether the content item has been previously bookmarked. If the content item has been previously bookmarked, the bookmarking and tagging service provider retrieves stored tag information at step 245.

The bookmarking and tagging service provider retrieves any previously stored tag information associated with the content item and performs a check at step 250 to determine whether a command to save the bookmark has been received. A script manager of a bookmarking and tagging service provider detects a save command, for example, when a user clicks on a button labeled "save" in order to save the bookmark. After receiving a save command, the bookmarking and tagging service provider stores the bookmark and any associated tag information, which may include user-defined and/or system-defined tags, at step 270. A script manager of a bookmarking and tagging service provider stores the bookmark, for example, by issuing commands to a bookmark and tag manager. The bookmark and tag manager stores the bookmark and associated tag information along with captured user information in the bookmark and tag database.

If the bookmarking and tagging service provider has not received a save command at step 250, a check is performed at step 260 to determine whether tag information has been received. After receipt of any tag information from user input at step 265, the bookmarking and tagging service provider waits to receive a save command at step 250.

Figure 3:
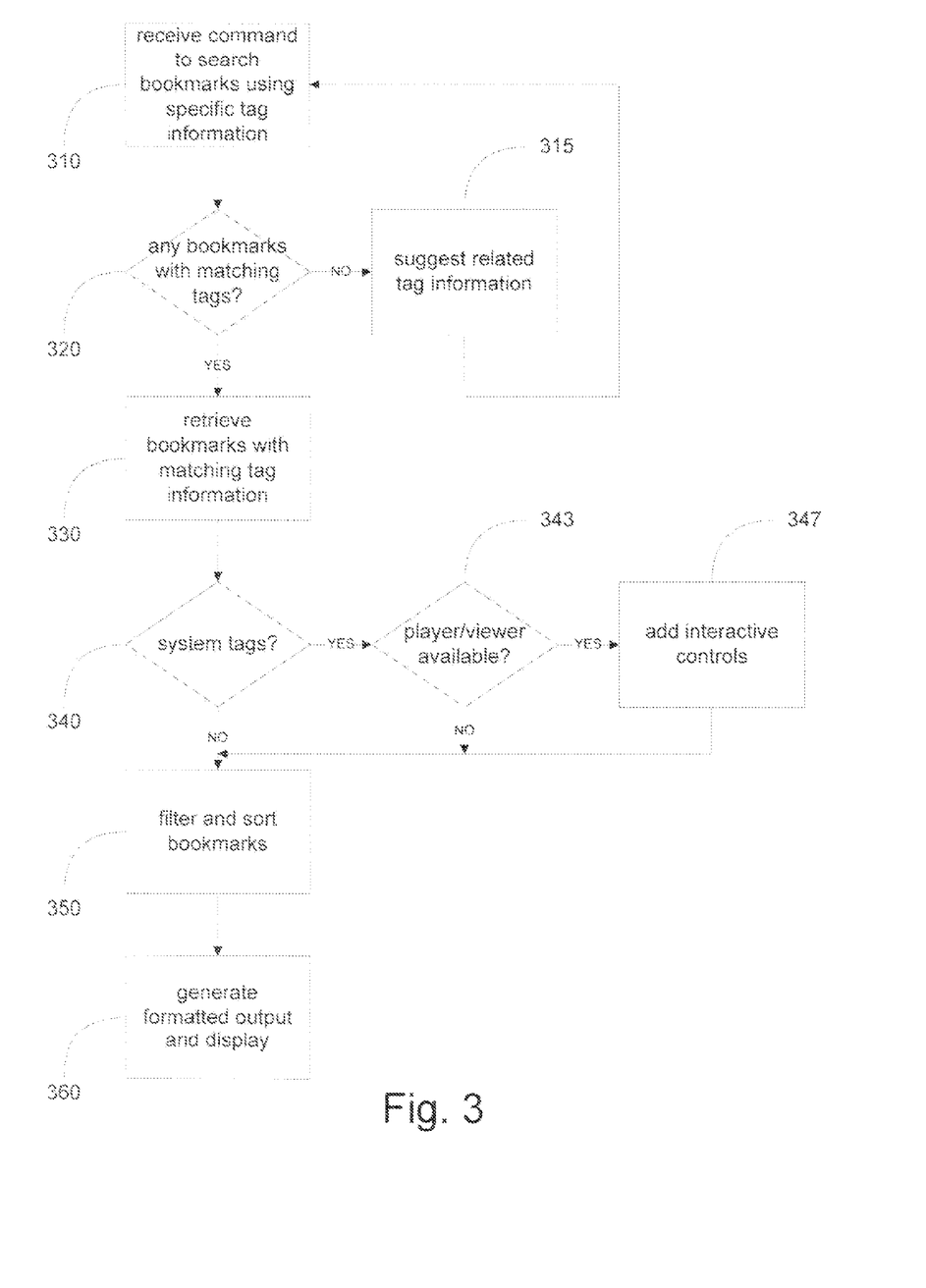
FIG. 3 is a flow diagram presenting a method for processing a request to search for bookmarks based on tag information according to one embodiment of the present invention.

After bookmarks and tags have been stored in the bookmark and tag database the bookmarking and tagging service provider may receive a request to search for bookmarks using specific tag information, such as one or more specific tags. FIG. 3 presents a flow diagram illustrating one embodiment of a method processing a request to search for bookmarks based on specific tag information. According to the method of FIG. 3, a bookmarking and tagging service provider receives a command to search for bookmarks using specific tag information at step 310. A script manager of the bookmark and tagging service provider may receive the command to search for bookmarks, for example, according to a number of techniques, e.g., when a user enters tag information on a form on a web page and enters a search command by clicking on a button or hyperlink labeled "search." The command to search for bookmarks may include tag information, such as one or more tags to use as search criteria.

After receiving the command to search for bookmarks using the specific tag information as search criteria, the bookmarking and tagging service provider performs a check at step 320 to determine whether there are any bookmarks stored in the bookmark and tag database that have associated with them tag information that matches the specific tag information received at step 310. A script manager of the bookmarking and tagging service provider performs this check, for example, by issuing commands to a bookmark and tag manager to query a bookmark and tag database using the tag information as search criteria. If there are no previously stored bookmarks that have matching tag information, the bookmarking and tagging service provider may suggest related tag information at step 315. A script manager of the bookmarking and tagging service provider may issue commands to a bookmark and tag manager, for example, to suggest related tag information. The bookmark and tag manager may generate related tag information by using heuristics to determine tags that are the closest matches or tags whose meanings are synonymous with the specific tag information.

After suggesting related tag information, the bookmarking and tagging service provider waits to receive a command to search at step 310.

After determining that bookmarks stored in the bookmark and tag database have tag information that matches the tag information received at step 310, the bookmarking and tagging service provider retrieves the bookmarks with the matching tag information at step 330.

The bookmarking and tagging service provider performs a check at step 340 to determine whether any of the retrieved bookmarks and associated tag information includes system tags. System tags may be added to bookmarks for content items that are media files. If the retrieved bookmarks are associated with content items that are media files such that the bookmarks have system-defined tag information, then the bookmarking and tagging service provider performs a check at step 343 to determine whether a media player or viewer is available to the user. A script manager of the bookmarking and tagging service provider may check the capabilities of the user's client device, or it may provide an appropriate player or viewer control to the user. If an appropriate media player or viewer is available at step 343, the bookmarking and tagging service provider adds interactive controls to the retrieved bookmarks at step 347. Interactive controls may include, for example, controls to allow a user to play, pause, or stop playing an audio or video file. Interactive controls may also include, for example, controls to allow a user to view images or formatted text documents. A script manager of the bookmarking and tagging service provider may add interactive controls, for example, by associating interactive controls with retrieved bookmarks for later display on a web page.

The bookmarking and tagging service provider filters and sorts the bookmarks at step 350. A script manager of the bookmarking and tagging service provider may filter and sort the bookmarks, for example, by issuing commands to a bookmark and tag manager. Alternatively, a script manager may run scripts to filter and sort the bookmarks. Because the retrieved bookmarks may be too numerous to display at once, the script manager may filter and sort the bookmarks according to various criteria. Such filtering and sorting criteria may involve, for example, the date and time that a bookmark was added to the bookmark and tag database, the popularity of a bookmarked content item (e.g., as manifested in the number of users who have bookmarked the content item), the user associated with each bookmark, etc.

The bookmarking and tagging service provider generates formatted output and displays it to the user at step 360. A script manager of the bookmarking and tagging service provider may generate formatted output, for example, by issuing commands or running scripts to generate a web page that includes a listing of retrieved bookmarks and interactive controls for bookmarked content items. The web page may further include additional controls to allow a user to filter and sort the retrieved bookmarks based on other or additional criteria. The additional controls may allow a user to filter and sort retrieved bookmarks to display the most recent bookmarks, the most popular bookmarks, the user's own bookmarks, a specific number of bookmarks, etc. The web page may further include a tag navigation control (to allow a user to search for bookmarks using different tag information as search criteria) and a feed control (such as a button control to allow a user to send a command to generate a feed based on the web page including retrieved bookmarks).

Figure 4:
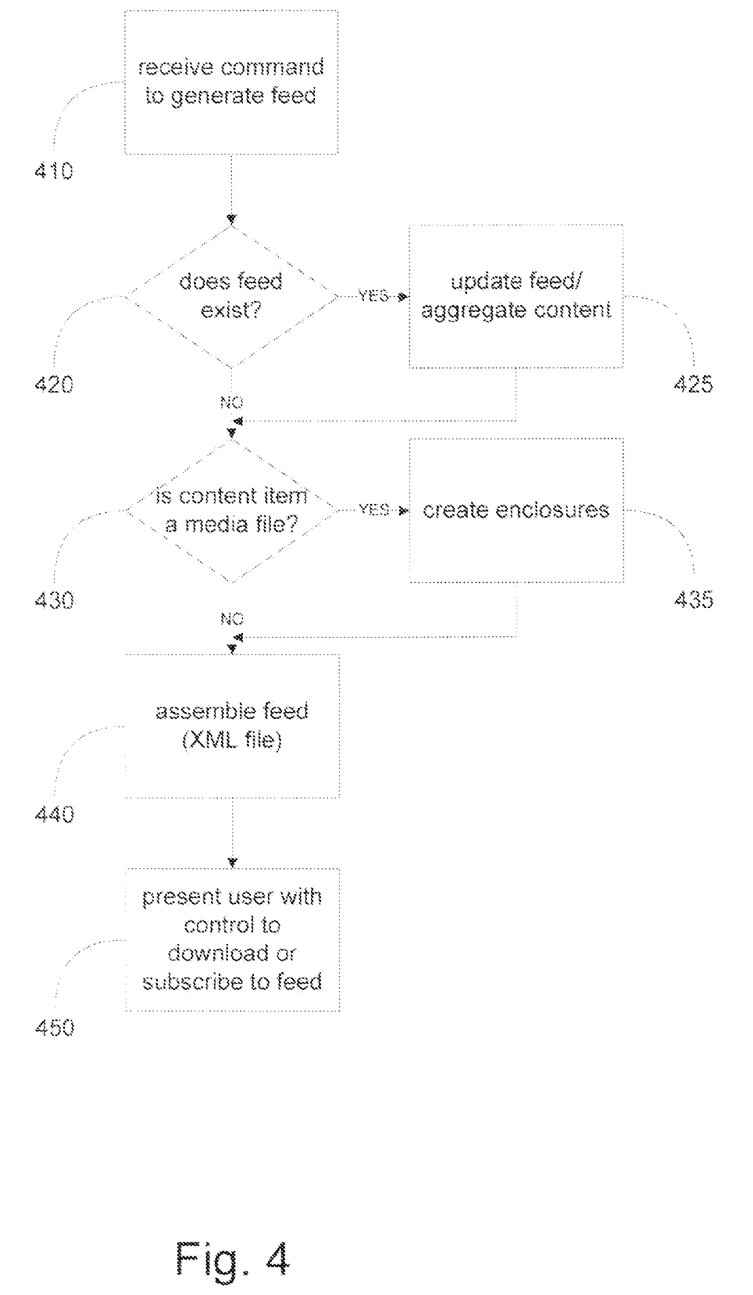
FIG. 4 is a flow diagram presenting a method for processing a request to create a channel or feed from a set of bookmarks according to one embodiment of the present invention.

FIG. 4 presents a flow diagram illustrating one embodiment of a method for processing a request to create a channel or web feed from a set of bookmarks. According to FIG. 4, a bookmarking and tagging service provider receives a command to generate a feed at step 410. A script manager of the bookmark and tagging service provider may receive the command to generate a feed, for example, when a user clicks on a button or a hyperlink added to a web page by a content provider, where the button or hyperlink may link to an HTTP request to initiate a connection with a bookmark and tagging service provider or to execute a script served by the bookmarking and tagging service provider. Alternatively, a script manager of the bookmarking and tagging service provider may receive a command to generate a feed when a user clicks on a browser button or activates a browser extension linked to an HTTP request to initiate a connection with a bookmark and tagging service provider or to execute a script served by the bookmarking and tagging service provider.

After receiving the command to generate a feed, the bookmarking and tagging service provider performs a check at step 420 to determine whether the feed exists. A script manager of the bookmarking and tagging service provider may perform the check by issuing commands to a content manager. If the feed exists, then the bookmarking and tagging service provider updates the feed and aggregates the content. At step 425, a script manager may issue commands to a content manager to update content in a feed by appending references to content items and appending part or all of a content item itself to the feed.

For each bookmarked content item referenced by the set of bookmarks that will form the basis of the feed, the bookmarking and tagging service provider performs a check at step 430 to determine whether a bookmarked content item is a media file. A script manager of the bookmarking and tagging service provider may perform the check, for example, by issuing commands to a content manager to determine whether a content item is a media file. The bookmarking and tagging service provider may utilize a tag extractor to extract information regarding the file type of a content item in order to determine whether the content item is a media file. If a content item is a media file, the bookmarking and tagging service provider may create an enclosure for the media file in the feed. A script manager may issue commands to a content manager to create enclosures.

The bookmarking and tagging service provider assembles the feed at step 440. A script manager of the bookmarking and tagging service provider may assemble the feed by running scripts or issuing commands to an XML processor. The XML processor may assemble an XML file that may be read by an RSS-enabled application, or an XML file that may be read by an Atom-enabled application. The feed may comprise, for example, an RSS description and various items. The RSS description may include, for example, RSS version information, a channel title or feed title, a channel link or feed link, and a channel description or feed description. Each item may include an item title, an item link, and item description, and an enclosure URL. The item title may be a file name or other title for the content item, while the item link information may be an address such as a URL. The item description may be a user-defined description of the content item, or a content provider or content server serving the content item may provide a description. The item enclosure URL provides a link to the content item and indicates that the content item is a media file. Because the link is encapsulated within the <enclosure> tag of the XML file, an RSS reader or aggregator can download the content item as part of the feed.

After assembling the feed, the bookmarking and tagging service provider presents the user with controls to download or subscribe to the feed at step 450. A script manager of the bookmarking and tagging service provider may display a web page containing XML code corresponding to the feed and may provide a feed control, such as a button control, to allow the user to download the feed to the user's client device.

Figure 5:
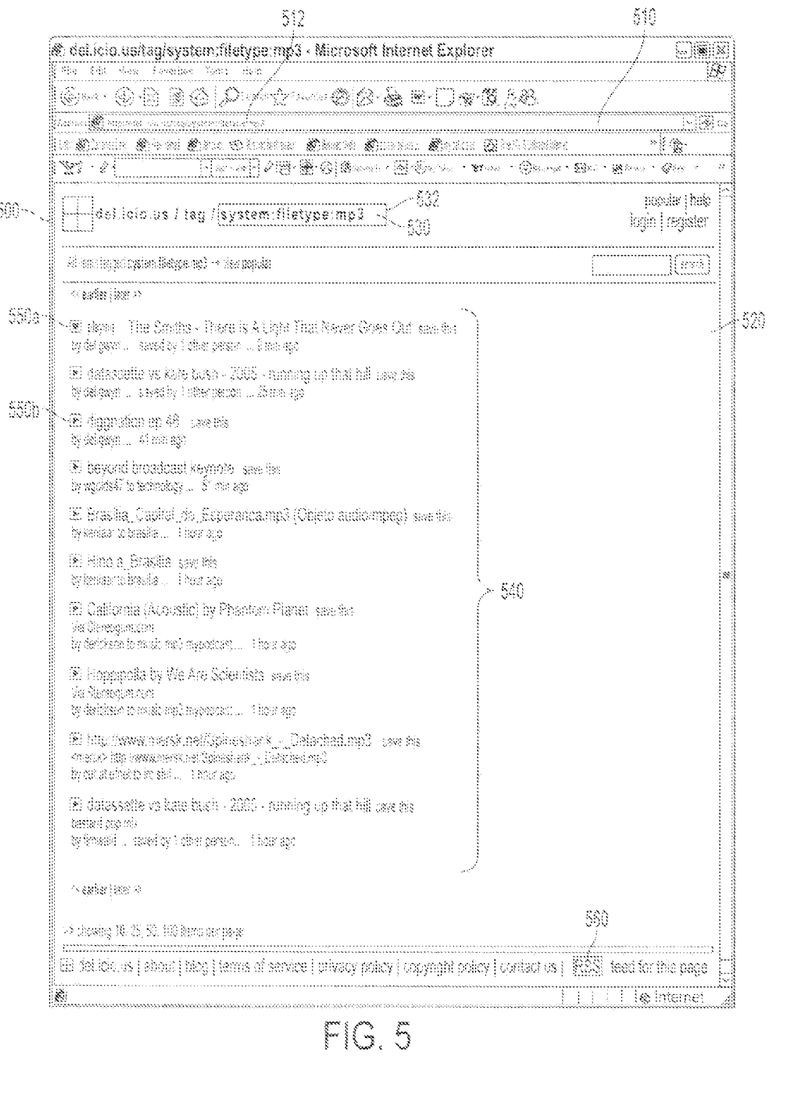
FIG. 5 is a screen diagram presenting a user interface for searching for bookmarks using tag information and for generating a feed from a set of retrieved bookmarks according to one embodiment of the present invention.

FIG. 5 presents a screen diagram illustrating a user interface for searching for bookmarks using tag information and for generating a feed from a set of retrieved bookmarks according to one embodiment of the present invention. According to FIG. 5, a web browser window 500 comprises an address bar 510 and a web page 520. The address bar 510 contains an address 512. The web page 520 further comprises a lag navigation control 530, retrieved bookmarks 540, interactive controls 550a and 550b, and a feed control 560. The tag navigation control 530 allows a user to enter specific tag information, such as tag 532. When a user of a bookmarking and tagging service provider searches for bookmarks based on specific tag information, the user may enter tag information by navigating to a particular web page by entering an address 512 in the address bar 510. The user may alternatively utilize the tag navigation control 530 to enter specific tag information, such as tag 532.

When a user searches for bookmarks based on tag information, the bookmarking and tagging service provider displays a list of retrieved bookmarks 540 on the web page 520, where the retrieved bookmarks 540 have associated tag information matching the tag information the user provides. In the exemplary embodiment of FIG. 5, the specific tag 532 is a system tag for audio files encoded using the MP3 file format. Accordingly, the retrieved bookmarks 540 all correspond to content items that are MP3 files. For retrieved bookmarks whose associated content items are media files, interactive controls 550a and 550b, for example, may be displayed. Interactive control 550a is a stop control that allows a user to stop playing a bookmarked content item that is an audio file. Interactive control 550b is a play control that allows a user to play a bookmarked content item that is an audio file. Feed control 560 allows a user to send a command to generate a feed for the web page 520 which is a feed based on a set of retrieved bookmarks.

Figure 6:
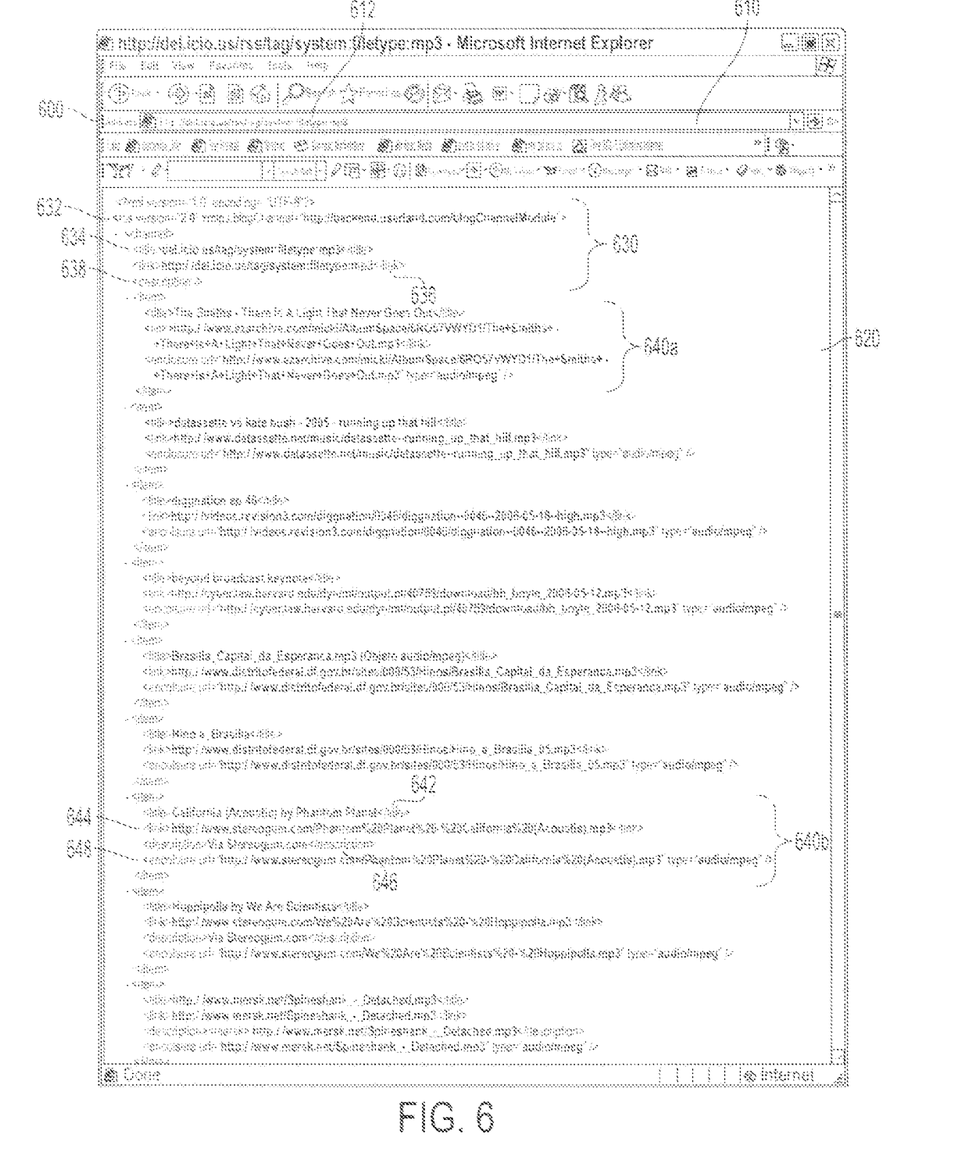
FIG. 6 is a screen diagram presenting an example XML file corresponding to a feed generated by a bookmarking and tagging service provider according to one embodiment of the present invention.

FIG. 6 presents a screen diagram illustrating an example XML file corresponding to a feed generated by a bookmarking and tagging service provider according to one embodiment of the present invention. According to FIG. 6, a web browser window 600 comprises an address bar 610 and a web page 620. The address bar 610 contains an address 612. The web page 620 further contains an XML file having feed description 630 and items 640a and 640b. Feed description 630 comprises RSS version information 632, channel title information 634, channel link information 636, and channel description information 638. An item 640b comprises item title information 642, item link information 644, item description information 646, and item enclosure information 648. When a user sends a command to generate a feed based on a set of retrieved bookmarks, a bookmarking and tagging service provider generates an XML file and may display it as a web page 620 to the user. The bookmarking and tagging service provider may allow the user to download the displayed XML file to the user's client device.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

I claim:

1. A method comprising:
receiving a command to bookmark a content item;
capturing content-identifying information that identifies the content item;
determining a file type of the content item;
tagging the content item with tag information based on the file type of the content item;
determining one or more compatible interactive viewers for the content item on the basis of the file type of the content item and on the basis of a client device of a given user;
associating the one or more compatible interactive viewers with the client device of the given user corresponding to the content item; and
storing the content-identifying information, tag information and the association of the one or more compatible interactive viewers with the client device of the given user corresponding to the content item, the association capable of being utilized, upon retrieval of the content item by the given user, to identify the compatible interactive viewers associated with the client device of the given user.

2. The method of claim 1, wherein receiving a command to bookmark a content item comprises receiving a command via a browser control.

3. The method of claim 1, wherein receiving a command to bookmark a content item comprises receiving a command via a button control or hyperlink added to a web page by a content provider.

4. The method of claim 1, wherein capturing content-identifying information comprises capturing a URL of the content item.

5. The method of claim 1, wherein determining a file type comprises identifying a file extension.

6. The method of claim 1, wherein determining a file type comprises determining that a content item is an audio file, a video file, an image file, or a formatted text document.

7. The method of claim 6, wherein determining a file type comprising determining that a content item is a MP3 file, a WAV file, a MPEG file, a AVI file, a MOV file, a JPEG file, a GIF file, a PNG file, a DOC file, or a PDF file.

8. The method of claim 7, wherein system-defined tag information identifies a content item as an audio file, a video file, an image file, or a formatted text document.

9. The method of claim 1, wherein tagging the content item comprises associating system-defined tag information with the content item.

10. The method of claim 1, wherein storing the content-identifying information and tag information comprises storing a bookmark in a database.

11. A method comprising:
storing content-identifying information, tag information and an association of one or more compatible interactive viewers with a client device of a given user corresponding to a content item, the association capable of being utilized, upon retrieval of the content item by the given user, to identify the compatible interactive viewers associated with the client device of the given user;
receiving a command to search for bookmarked content items having specific tag information and specific file types associated with the bookmarked content items;
querying a database of bookmarked content items for bookmarks having the specific tag information and specific file types;
retrieving the bookmarks;
identifying one or more compatible interactive viewers for the bookmarks on the basis of the specific file types associated with the bookmarks and on the basis of the client device of the given user;

retrieving the one or more compatible interactive viewers for the bookmarks corresponding the client device of the given user; and providing the one or more compatible interactive viewers along with the bookmarks.

12. The method of claim 11, wherein receiving a command to search for bookmarked content items comprises receiving tag information from a user of a bookmarking and tagging service provider.

13. The method of claim 12, wherein receiving tag information comprises receiving input from a user navigating to a specific URL corresponding to a specific tag, receiving input from a user using a tag navigation control on a web page, or receiving input from a user clicking on a hyperlink associated with a specific tag.

14. The method of claim 11, wherein receiving a command comprises receiving system-defined tag information corresponding to specific file types of audio files, video files, image files, or formatted text documents.

15. The method of claim 11, further comprising:
displaying a list of retrieved bookmarks along with interactive controls if the bookmarked content items are audio files, video files, image files, or formatted text documents.

16. The method claim 15, further comprising:
providing a control for generating a feed corresponding to a web page including a set of retrieved bookmarks.

17. The method of claim 16, wherein providing a control for generating a feed comprises providing a button or hyperlink on a web page to generate an RSS file or an Atom file.

* * * * *